No. 656,428.  
W. S. SHERD.  
TWINE TENSION DEVICE.  
(Application filed May 18, 1900.)

(No Model.)

Patented Aug. 21, 1900.

Witnesses.  
Robert Otto.  
Harry Kilgore.

Inventor.  
William S. Sherd.  
By his Attorneys.  
Williamson & Merchant

UNITED STATES PATENT OFFICE.

WILLIAM S. SHERD, OF BELVIEW, MINNESOTA.

TWINE-TENSION DEVICE.

SPECIFICATION forming part of Letters Patent No. 656,428, dated August 21, 1900.

Application filed May 18, 1900. Serial No. 17,081. (No model.)

*To all whom it may concern:*

Be it known that I, WILLIAM S. SHERD, a citizen of the United States, residing at Belview, in the county of Redwood and State of Minnesota, have invented certain new and useful Improvements in Twine-Tension Devices; and I do hereby declare the following to be a full, clear, and exact description of the invention, such as will enable others skilled in the art to which it appertains to make and use the same.

My invention has for its object to provide an improved twine-tension device; and to this end it consists of the novel devices and combinations of devices hereinafter described, and defined in the claims. Twine-tension devices of this character are especially adapted for use in connection with twine-binders; but they are capable of more general use wherever it is desired to put a yielding tension onto a cord or twine.

The invention is illustrated in the accompanying drawings, wherein like characters indicate like parts throughout the several views.

Figure 1:
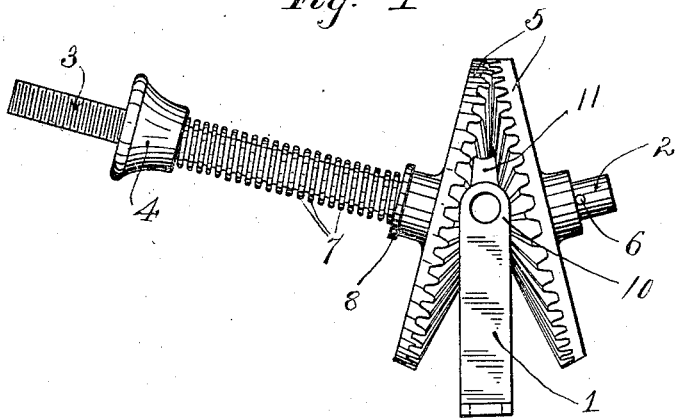
Figure 2:
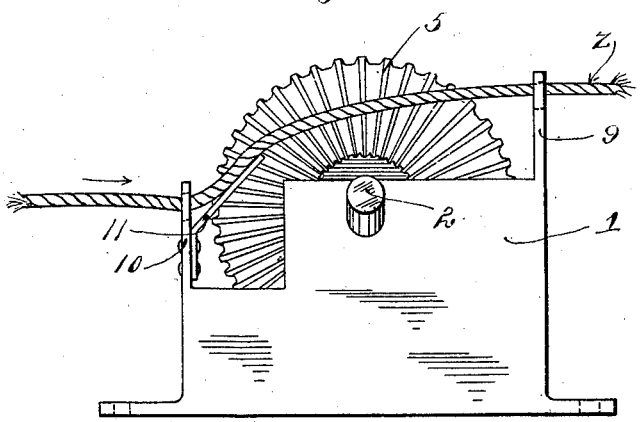

Figure 1 is a side elevation showing my improved twine-tension device, and Fig. 2 is an end elevation of the same with one of the gear-wheels removed.

The principal feature of this invention consists in the employment of a pair of beveled gears or similar corrugated intermeshing parts, which are yieldingly pressed together and between which the twine is adapted to be passed.

In the drawings the numeral 1 indicates a block or bearing having a pair of reversely but angularly projecting shafts or studs 2 3, which are driven into suitable seats in said block or otherwise secured, the latter of which is screw-threaded at its outer end and provided with a nut 4. Mounted one on each shaft 2 3 and intermeshing with each other is a pair of beveled gears 5, that work in planes intersecting at an acute angle. The gear on the shaft 2 is held against sliding movement by a pin 6, while the gear on the shaft 3 is yieldingly pressed toward the coöperating gear by a coiled spring 7 on said shaft 3, compressed between the nut 4 and a washer 8, which directly engages the hub of the said yielding gear 5. The teeth on the gears 5 are as long as possible, to give an extended engaging surface for the cord. The twine or cord (indicated by the character $z$) is passed through suitable guides, which direct the same between the intermeshed teeth of the gears 5. As shown, these guides are formed by a pair of perforated ears 9 and 10, projected from the block 1, and preferably also by a guide-arm 11, projected from the ear 10.

The action of the device above described will be as follows: The twine should be drawn through the device in the direction indicated by the arrow marked on Fig. 2. In passing between the gears the twine of course separates them more or less, depending on the tension of the spring 7. The greater the tension of the spring 7 the more deeply the twine will be pressed between the teeth of the gears, and consequently the greater will be the tension put upon the twine, or, in other words, the greater will be the power required to rotate the two gears. Hence it is obvious that the adjustment of the nut 4 makes it possible to put any desired tension on the twine. This device while extremely simple is very efficient.

It will of course be understood that the device above described is capable of considerable modification within the scope of my invention.

What I claim, and desire to secure by Letters Patent of the United States, is as follows:

1. A twine-tension device comprising a pair of intermeshing beveled gears, and guides for directing the twine between the intermeshing gear-teeth, substantially as described.

2. A twine-tension device, comprising a pair of intermeshing bevel-gears, guides for directing the twine between said gears, a spring pressing said gears together, and means for varying the tension of said spring, substantially as described.

3. In a twine-tension device, the combination with the support 1 having the projecting shafts 2 and 3, of the guides 9, 10, the intermeshing beveled gears 5, one on each shaft 2, 3, and the spring 7 and nut 4 on the shaft 3, said parts operating substantially as described.

In testimony whereof I affix my signature in presence of two witnesses.

WILLIAM S. SHERD.

Witnesses:
A. E. WESTON,
A. O. GIMMESTAD.